United States Patent [19]

Kato et al.

[11] 4,087,751

[45] May 2, 1978

[54] TRANSMITTER-RECEIVER CIRCUIT

[75] Inventors: Yasuo Kato; Yoshio Matsuo, both of Tokyo, Japan

[73] Assignee: Nippon Electric Co., Ltd., Tokyo, Japan

[21] Appl. No.: 753,163

[22] Filed: Dec. 21, 1976

[30] Foreign Application Priority Data

Dec. 26, 1975 Japan ............................... 50-158893

[51] Int. Cl.² ............................................. H04B 1/52
[52] U.S. Cl. ..................................... 325/24; 343/180
[58] Field of Search ....................... 325/18, 19, 20, 23, 325/24, 25; 343/180, 181; 333/24.1

[56] References Cited

U.S. PATENT DOCUMENTS 2,505,655  4/1950  Van Weel .............................. 325/20
2,789,210  4/1957  Arnold .................................. 325/24

Primary Examiner—Benedict V. Safourek
Attorney, Agent, or Firm—Sughrue, Rothwell, Mion, Zinn and Macpeak

[57] ABSTRACT

A compact transmitter-receiver circuit particularly adapted for short-distance mobile communication includes a pair of parallel nonlinear circuits, first and second hybrid circuits connected to the pair of nonlinear circuits on their high- and low-frequency sides, respectively, and a radio-frequency generator and a driver circuit connected to the respective hybrid circuits. One of the four terminals of the first hybrid circuit serves as a common input-output terminal of the transmitter-receiver circuit without necessitating any particular means conventionally required for separation between transmission and reception signals.

10 Claims, 9 Drawing Figures

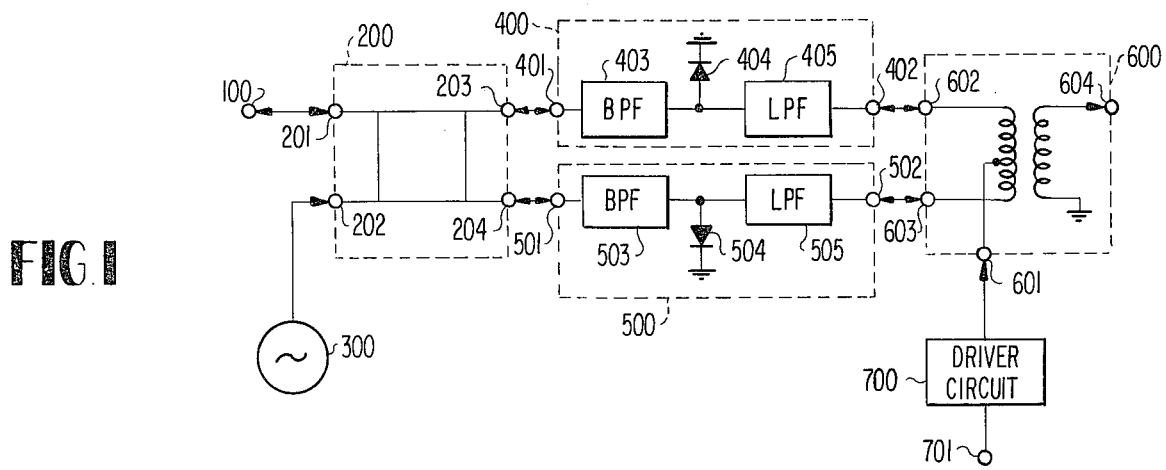
FIG.1
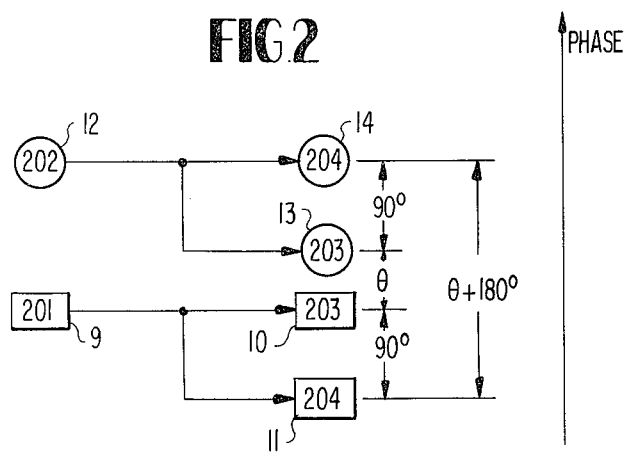
FIG.2
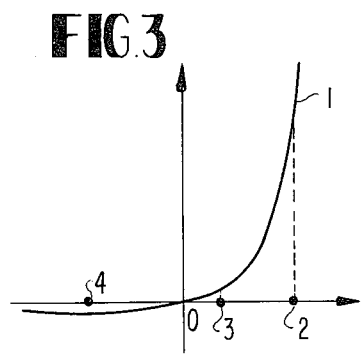
FIG.3
FIG.4
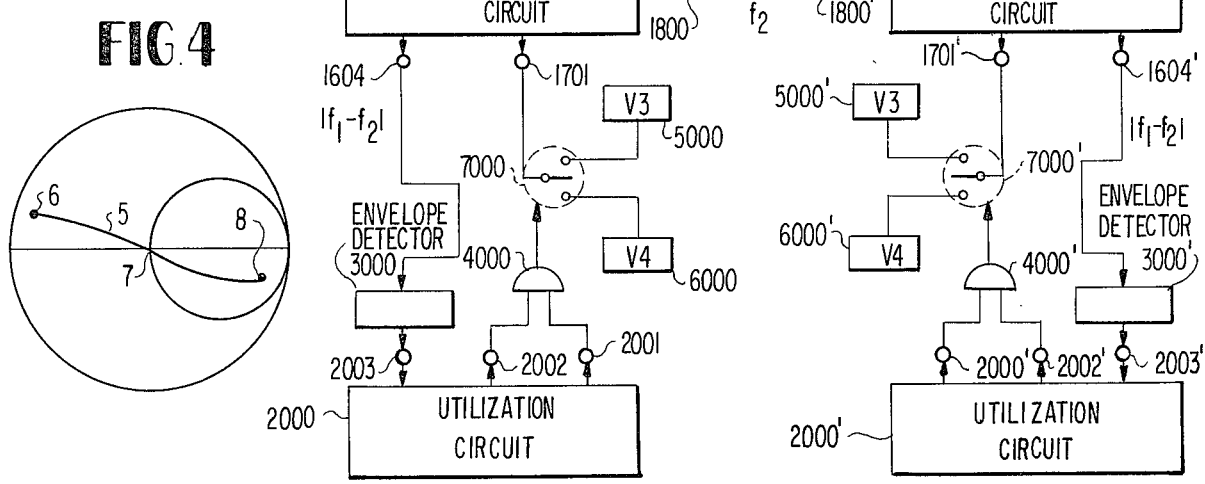
FIG.5

TRANSMITTER-RECEIVER CIRCUIT

BACKGROUND OF THE INVENTION

This invention relates to a transmitter-receiver circuit for use in a half-duplex communication system or in a system arranged for an alternate, one way at a time, independent transmission.

Generally, in a communication system, transmitter and receiver are separately provided for signal transmission and reception and, in aerial communication, the use of separate antennas are often used for transmission and reception. Such a communication system is characterized by its large size in structure and is undesirable for use as a simple and compact communication means. Particularly, where antennas are employed separately for transmission and reception, leakage radiation of the local oscillation occurring from the receiving antenna may interfere with the signal sent from the transmitting antenna and adversely affect the effective directivity of the latter and the modulation index. In some systems, transmitter and receiver separately provided are arranged to share a single antenna, but such a system necessitates an additional component, such as a duplexer, a nonreciprocal circuit or a switchover unit, for separation between transmitting and receiving signals and actually, due to more or less the imperfection of such additional components, some interference between the signals is unavoidable and not negligible. For an example of the use of a duplexer for the signal separation, reference may be made to an article by William L. Firestone entitled "Multiplexing Klystrons" in *Electronics for Communication Engineers*, pages 320-325, published by McGraw-Hill Book Co., in 1952 (particularly see FIG. 6 on page 323). Reference may also be made to an article by A. Egger entitled "FM 120/5000 Radio Link System" published in *IEEE Transactions on Communication Technology*, Vol. COM-14, No. 4, August, 1966, page 449, 455 (particularly FIG. 7), for an example of signal separation employing a nonreciprocal circuit.

SUMMARY OF THE INVENTION

An object of the present invention is to provide a novel transmitter-receiver circuit particularly adaptable for use in a simple mobile communication system employing a microwave or millimeter-wave carrier frequency for short-distance digital communication and free from the disadvantages of the prior art circuits.

The present invention comprises first and second hybird circuits each having four terminals, first and second nonlinear circuits each having high-frequency and low-frequency signal terminals with respective nonlinear elements connected thereto, a driver circuit operable to produce a bias voltage in response to a modulating signal, and a radio-frequency generator.

According to the present invention, a compact transmitter-receiver circuit is realized with the integrated front end for signal transmission and reception. Also, the present invention can provide a transmitter-receiver circuit free from the interference between transmission and reception signals with a single radio-frequency generator arranged to serve as a carrier wave source for transmission and as a local oscillation source for reception. In addition, the present invention can make a transmitter-receiver circuit enabling the use of a common transmission-reception antenna without adding any particular circuit for separation between the signal transmission and reception. Further, the present invention can provide a transmitter-receiver circuit of low noise figure even with a radio-frequency generator of relatively high noise level.

BRIEF DESCRIPTION OF THE DRAWINGS

The above and other objects and advantages of the present invention will become apparent from the following detailed description in conjunction with the accompanying drawings, in which:

FIG. 1 is a block diagram of a preferred embodiment of the present invention;

FIG. 2 is an explanatory diagram of the phase relationship between the input signals to the nonlinear circuits in FIG. 1;

FIG. 3 is a diagram of the voltage-current characteristic of the diodes included in the respective nonlinear circuits in FIG. 1;

FIG. 4 is a Smith chart illustrating the impedance locus of the nonlinear circuits of FIG. 1;

FIG. 5 is a block diagram of an application of the transmitter-receiver circuit of FIG. 1;

DESCRIPTION OF THE PREFERRED EMBODIMENTS

Figure 6:
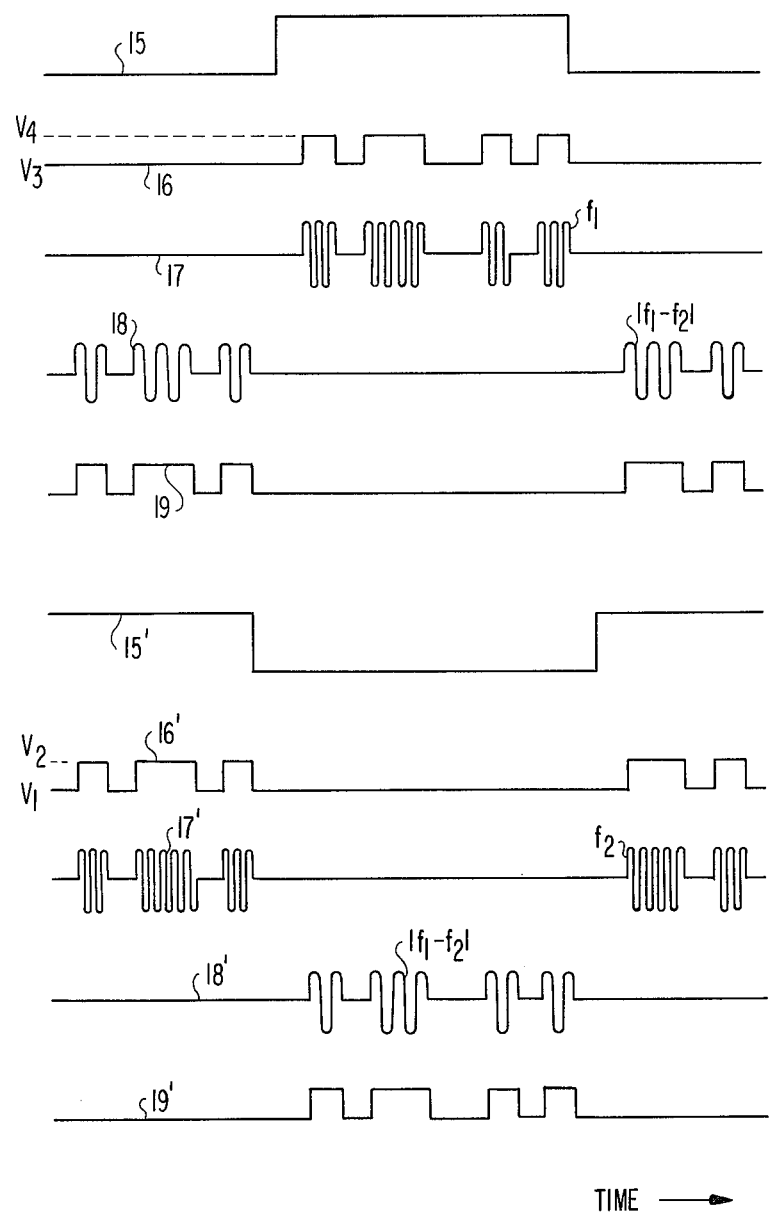
FIG. 6 is a waveform chart showing waveforms appearing at respective locations in the system of FIG. 5.

In FIG. 1, a common input-output terminal 100 is connected to a first hybrid circuit 200 consisting of a 90° branch-line hybrid circuit having a first terminal 201, a second terminal 202, a third terminal 203 and a fourth terminal 204, respectively. The design and operation of such a 90° branch-line hybrid circuit are well known in the art and are disclosed in detail, for example, in Chuck Y. Pon, "Hybrid-Ring Directional Coupler for Arbitrary Power Divisions," *IRE Transactions on Microwave Theory and Techniques*, Vol. MTT-9, No. 6, November 1961, pages 529-535. A radio-frequency oscillator or generator is shown at reference numeral 300 connected to hybrid circuit terminal 202. A first nonlinear circuit 400 and a second nonlinear circuit 500 have high-frequency signal terminals 401 and 501 connected to hybrid circuit terminals 203 and 204, respectively. The nonlinear circuits 400 and 500 also have low-frequency signal terminals 402 and 502, respectively. The nonlinear circuits 400 and 500 include band-pass filters 403 and 503, diodes 404 and 504 and low-pass filters 405 and 505, respectively. A second hybrid circuit 600 consisting of a so-called hybrid transformer has second and third terminals 602 and 603 connected to the low-frequency terminals 402 and 502, respectively, of the nonlinear circuits 400 and 500. The second and third terminals 602 and 603 are connected to the primary winding, while the first and fourth terminals 601 and 604 are connected to the primary center tap and the secondary winding, respectively, of hybrid circuit 600. A driver circuit 700 has a modulating signal input terminal 701 and is connected to the center tap terminal 601 of hybrid circuit 600.

The receiving operation of the present transmitter-receiver circuit will be described next.

The received signal through the common input-output terminal 100 is divided in the first hybrid circuit 200 into two equal parts, which are sent to the nonlinear circuits 400 and 500, respectively, through the terminals 203 and 204 of the hybrid circuit 200. It is to be noted that the received signal appearing at the terminal 204 is 90° delayed in phase in comparison with that appearing at the terminal 203. The 90° phase difference is due to the fact that the branch lines of the hybrid circuit 200 interconnecting the line extending between the terminals 201 and 203 and the line between the terminals 202 and 204 are quarter wavelength lines.

Similarly, the signal supplied from the radio-frequency generator 300 is divided in the hybrid circuit 200 into two parts, which are fed to the nonlinear circuits 400 and 500, respectively, by way of the terminals 203 and 204. As will be readily understood from the foregoing, the signal from the generator 300 appearing at the terminal 204 is 90° advanced in phase in comparison with that appearing at the terminal 203. Each of the nonlinear circuits 400 and 500 fed with the received signal and the output signal of the radio-frequency generator 300 operates as a frequency converter employing the signal from the generator 300 as a local oscillation, and produces at the low-frequency signal terminal 402 or 502 an intermediate-frequency signal of a frequency corresponding to the frequency difference between the two signals fed thereto. Such a function of the nonlinear circuits 400 and 500 as the frequency converter is itself very well-known, and the operating principle of such circuits is disclosed, for example, in the Crystal Rectifiers (*Massachusetts Institute of Technology, Radiation Laboratory Series*), pages 1–5, described by Henry C. Torrey and Charles A. Whitmer and published by McGraw-Hill Book Co., in 1948. In this connection, it should be noted that, owing to the phase characteristics of the first hybrid circuit described before, the phase difference between the received signal and the local oscillation both appearing at the terminal 501 of the second nonlinear circuit 500 is expressed by ($\theta + 180°$) in contrast to the phase difference $\theta$ between the two signals appearing at the terminal 401 of the first nonlinear circuit 400. Thus, the two phase difference differ from each other by an amount of 180°.

This phase relationship is diagrammatically illustrated in FIG. 2, in which reference numerals 9, 10 and 11 designate the phases of the received signal at the respective terminals 201, 203 and 204 of the first hybrid circuit 200 while reference numerals 12, 13 and 14 designate the phases of the local oscillation at the respective terminals 202, 203 and 204 of the hybrid circuit 200. In this diagram, $\theta$ represents the phase difference between the received signal and the local oscillation at the terminal 401 of the nonlinear circuit 400 connected to the terminal 203 of the hybrid circuit 200, and, as will readily be observed, the phase difference between the received signal and the local oscillation at the terminal 501 of the nonlinear circuit 500 connected to the terminal 204 of the hybrid circuit 200 amounts to ($\theta + 180°$). That is to say, the phase difference between the two input signals fed to either of the two nonlinear circuits 400 and 500 differs from that between the two input signals fed to the other nonlinear circuit by an amount of 180°. Furthermore, the frequency and phase of the intermediate-frequency signal produced at the low-frequency signal terminal 402 or 502 of each of the nonlinear circuits 400 and 500 correspond to the difference between the two input signals fed to the high-frequency input terminal 401 or 501 of the nonlinear circuit. This means that the intermediate-frequency signals appearing at the terminals 402 and 502 are opposite in phase. Such opposite-phase intermediate-frequency signals are combined in the second hybrid circuit 600 to appear as a received signal output at the terminal 604. More specifically, the opposite-phase intermediate-frequency signals applied to the respective terminals 601 and 602 of the hybrid circuit 600 jointly cause a current flow through the primary winding connected to those terminals and the primary current induces a voltage across the secondary winding, which is electromagnetically coupled with the primary winding and connected at one end to the output terminal 604 of the circuit 600. In this way, there is no intermediate-frequency signal appearing at the remaining terminal 603 of the hybrid circuit 600 connected to the center tap of the primary winding.

On the other hand, since any noise produced from the radio-frequency generator 300 enters the terminal 202 of the hybrid circuit 200 together with the local oscillation, consequent noises appear at the terminals 402 and 502 of the nonlinear circuits 400 and 500, respectively, in phase with each other so as not to cause any current through the primary winding. Therefore, no noise component appears at the output terminal 604.

The band-pass filter 403 and 503 of the respective nonlinear circuits function to couple the received signal and the local oscillation fed through the respective terminals 401 and 501 of the diodes 404 and 504, respectively, and at the same time, to prevent the intermediate-frequency signals produced at the respective diodes 404 and 504 from leaking out through the terminals 401 and 501. The low-pass filters 405 and 505 function to couple the intermediate-frequency signals to the respective low-frequency signal terminals 402 and 502, and at the same time, to prevent the leakage of the received signal and the local osciallation through those two terminals.

The above-mentioned receiving operation is quite the same as the operation of balanced-type frequency converters, which are already in wide use in the art. It will also be noted that, if the frequency of the generator 300 is in synchronism with the carrier wave of the received signal, the present circuit operates as a coherent detector and not as a frequency converter.

Description will next be made to show that the circuit construction of FIG. 1 can also operate satisfactorily as a transmitter circuit.

In the chart of FIG. 3, on which the abscissa represents voltage and the ordinate current, curve 1 represents the voltage-current characteristic of the diodes 404 and 504 provided in the respective nonlinear circuits 400 and 500 of FIG. 1. The impedance of the circuits 400 and 500 as seen at the terminals 401 and 501 is shown in the Smith Chart of FIG. 4, in which curve 5 represents the locus of such an impedance obtained with variation of the bias voltage applied to the diode 404 or 504. In FIG. 4, points 6, 7 and 8 correspond to the respective values of the bias voltage indicated in FIG. 3 at reference numerals 2, 3 and 4.

Now assuming that the voltage given from the driver circuit 700 to the diodes 404 and 504 through the hybrid circuit 600 has the value indicated in FIG. 3 at the point 2. Then, the nonlinear circuits 400 and 500 perform full-reflection as apparent from FIG. 4, and the signal from the radio-frequency generator 300 to the terminal 203 of the hybrid circuit 200 is full-reflected by the circuit 400 and appears at the terminal 201. Similarly, the signal from the generator 300 to the terminal 204 is full reflected by the circuit 500 and appears at the terminal 201. The two signals appearing at the same terminal 201 are in phase with each other, and the combined power obtainable at the common input-output terminal 100 is substantially equal to the output power of the generator 300.

Next, the voltage supplied from the driver circuit 700 to the diodes 404 and 504 through the hybrid circuit 600 is assumed to have the value indicated in FIG. 3 at the point 3. As apparent from FIG. 4, the nonlinear circuits 400 and 500 substantially perform the non-reflection, and there is no power appearing at the terminal 201. In other words, when the bias voltage is changed between the values indicated in FIG. 3 at the points 2 and 3, respectively, depending on the modulating input signal to the terminal 701, a transmission signal in the form of a pulse-amplitude-modulated signal formed on a carrier wave given as the output signal of the generator 300 is obtained at the terminal 100. It will be apparent that the pulse-amplitude modulation may also be effected by selecting bias points at values indicated in FIG. 3 at reference numerals 3 and 4, respectively. Incidentally, the variation of the bias voltage corresponding to the modulating signal does not appear at the terminal 604 owing to the arrangement of the hybrid circuit 600 and thus, has no adverse effect upon the next stage intermediate-frequency circuit (not shown) connected to the terminal 604.

Thus, the present circuit can operate not only as a receiver but also as a transmitter with the same circuit arrangement. Although the present circuit is usable in a half-duplex communication system for alternate signal transmission reception, when the present circuit is operating as a receiver, the bias voltage applied to the diodes 404 and 504 is continually held at the bias point 3 (FIG. 3) or in its vicinity. Under such a condition, the nonlinear circuits 400 and 500 can operate efficiently as a frequency converter with the minimum spurious radiation from the terminal 100.

One practical application of the present invention will next be described with reference to FIG. 5 and the waveform diagram of FIG. 6

Illustrated in FIG. 5 is a half-duplex communication system including at each of the two stations a transmitter-receiver circuit 1000 or 1000' of the form shown in FIG. 1. Terminals 1100 or 1100', 1701–1701' and 1604–1604' correspond to the terminals 100, 701 and 604 in FIG. 1, respectively. Reference numerals 1800 and 1800' indicate common transmission-reception antennas of the respective stations, and reference numerals 2000 and 2000' indicate respective utilization circuits (such as transmit-receive mode selection and transmitter and receiver peripheral circuits) having switching signal terminals 2001 and 2001', for transmission-reception transmission-data output terminals 2002 and 2002' and reception-data input terminals 2003 and 2003', respectively. Reference numerals 3000 and 3000' indicate envelope detectors and reference numerals 4000 and 4000' represents AND gates. Voltage sources 5000 and 5000' and 6000 and 6000' give voltages $V_3$ and $V_4$ corresponding to the bias voltages 3 and 4 in FIG. 3, respectively. Switchover units 7000 and 7000' are operable under control of the output signals of the AND gates 4000 and 4000', respectively, to select the voltage source 6000 or 6000' when the corresponding AND gate output signal is at high level and the voltage source 5000 or 5000' when the corresponding AND gate otuput signal is at low level. Thus, the switchover units 7000 and 7000' supply the selected voltages to the associated terminals 1701 and 1701' of the transmitter-receiver circuit 1000 and 1000', respectively.

Next, the operation of the system of FIG. 5 is described with reference to FIG. 6. In this drawing, a waveform 15 represents the switchover signal for transmission reception appearing at the terminal 2001 and, only during the time when the voltage of such a signal is at high level, the transmission data given at the terminal 2002 is effectively utilized under the action of the AND gate 4000 and either the voltage $V_4$ or $V_3$ is fed to the terminal 1701 depending on the high level or the low level of the transmission data. During the time when the switchover signal for transmission-reception is at low level, the terminal 1701 is fed with the voltage $V_3$ irrespective of the transmission data. The waveform at the terminal 1701 is illustrated at reference numeral 16 in FIG. 6.

As will be apparent, the transmitter-receiver circuit 1000 operates for amplitude modulation depending on the voltage supplied at the terminal 1701. A waveform 17 of FIG. 6 represents the transmission signal obtained at the terminal 1100. The carrier frequency of the transmission signal 17 is obviously equal to a frequency $f_1$ of the radio-frequency generator employed in the transmitter-receiver circuit 1000. The signal 17 is radiated by the associated antenna 1800 and received by the antenna 1800' to be fed to the transmitter-receiver circuit 1000' through its terminal 1100' and mixed with the local oscillation of a frequency $f_2$ from the radio-frequency generator of the circuit 1000'. In this manner, an intermediate-frequency signal of a frequency $|f_1 - f_2|$ is obtained at the terminal 1604' of the circuit 1000' as indicated at a waveform 18' of FIG. 6. The intermediate-frequency signal is detected by the envelope detector 3000' with the output signal as shown by a waveform 19' (FIG. 6) and directed to the reception-data input terminal 2003'. It will be evident that the waveform 19' coincides with the transmission data given to the terminal 2002 in the transmitting station.

For communication in the opposite direction, a voltage for example of a waveform 16' is given to the modulating signal terminal 1701' under the action of the switchover unit 7000' controlled by the AND logic of transmission data given to the terminal 2002' and the switchover signal for transmission-reception (waveform 15'). As a result, a signal of a waveform 17' is radiated from the antenna 1800'. Waveforms 18' and 19' of FIG. 6 represent those obtained at the terminals 1604 and 2003. The waveform 19' corresponds to the transmission data at the terminal 2002'. It will now be apparent that digital data communication can be performed alternately in opposite directions between the two stations in this system.

Though description has been made here of the transmitting operation as effected with a modulation system in which a carrier wave is interrupted depending on a modulating signal, analog amplitude modulation may also be provided by varying the bias voltage in a continuous fashion. As an alternative, double modulation may also be effected with the present circuit. In this case, the carrier wave is interrupted depending on a subcarrier as frequency-, phase- or amplitude-modulated by the modulating signal. Moreover, two-phase (phase) modulation may be derived by selecting the bias voltage to be given to the diodes 404 and 504 at the points 2 and 4 in FIG.

3 corresponding to the points 6 and 8 in the chart of FIG. 4, respectively.

Figure 7:
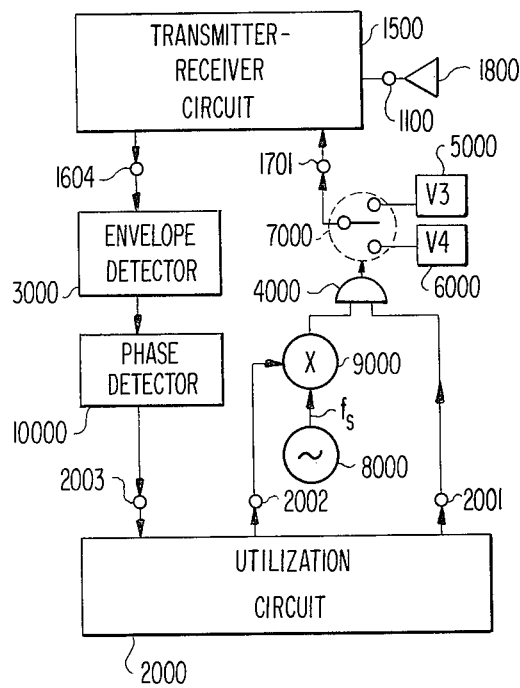
FIG. 7 is a block diagram of another application of the present circuit of FIG. 1.
Figure 8:
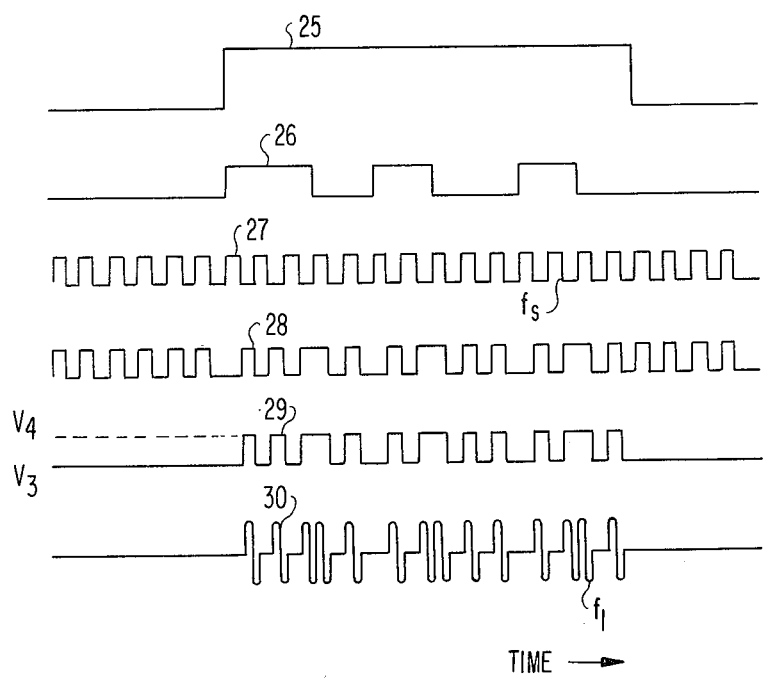
FIG. 8 is a waveform chart showing waveforms appearing at different locations in the system of FIG. 7.

Further description will be made with reference to FIG. 7 and the waveform diagram of FIG. 8 of a double-modulation communication system employing the present invention. It is assumed here that a subcarrier is phase-modulated and used to interrupt the carrier wave for transmission. In FIG. 7, structural elements identical to those shown in FIG. 5 are referred to by the same reference numerals, including 1000, 1100, 1604, 1701, 1800, 2000, 2001, 2002, 2003, 3000, 4000, 5000, 6000, and 7000. A subcarrier generator is represented by numeral 8000; two-phase phase-modulator, by 9000; and a phase detector, by 10000.

Detailed operation of this communication system will be described with reference to FIG. 8. A waveform 25 in this diagram represents a switchover signal for transmission-reception appearing at the terminal 2001; a waveform 26, transmission data fed to the terminal 2002; and a waveform 27, the output of the subcarrier wave generator 8000 of a frequency $f_r$. The subcarrier 27 is two-phase-modulated depending on the data waveform 26 and the resulting waveform is represented by a waveform 28. The switch 7000 is under control of the AND logic of the waveforms 28 and 25 and gives an output signal of a waveform 29 supplied to the modulating-signal terminal 1701 so that a carrier wave of a frequency $f_1$ is amplitude-modulated and the resulting signal is fed through the terminal 1000 to the antenna 1800 to be radiated therefrom as shown by a waveform 30.

The operation for signal reception will next be described below. Assuming that a signal having a carrier frequency $f_2$ and having the same waveform as that 30 in FIG. 8 is received by the antenna 1800. The signal is frequency-converted in the transmitter-receiver circuit 1000 and an intermediate-frequency signal of a frequency $|f_1 - f_2|$ is obtained at the terminal 1604 and given to the envelope detector 3000 with the output signal as shown by the waveform 29 to be fed to the phase detector 10000. As will be apparent, the output signal of the phase detector 10000 represents the received data having the waveform 26. It will now be clearly understood that the transmitter-receiver circuit of the present invention can also be applied to double-modulation communication systems efficiently.

Figure 9:
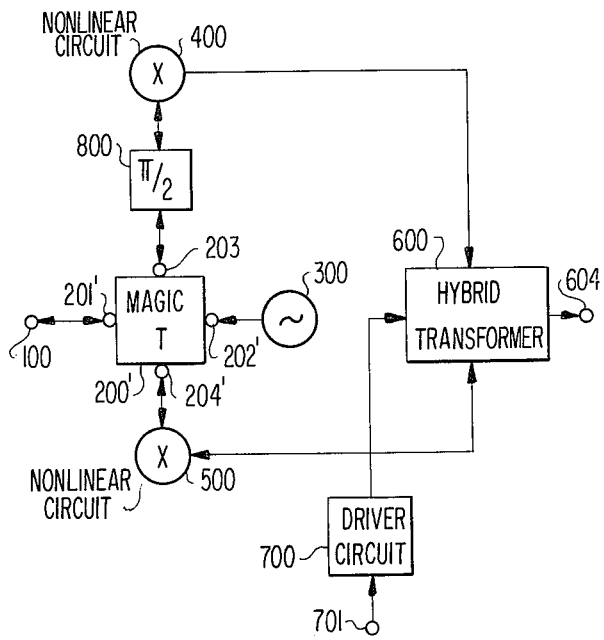
FIG. 9 is a block diagram of another embodiment of the present invention.

In FIG. 9, which illustrates another embodiment of the invention, the structural elements identical to those shown in FIG. 1 are referred to by the same reference numerals as at 100, 300, 400, 500, 600, 700, 604 and 701. As shown, in this embodiment, a magic-T 200' consisting of a 180° hybrid circuit now widely employed in microwave techniques is employed instead of the hybrid circuit 200 of FIG. 1 constructed by a 90° branch-line hybrid. For magic-T's, reference may be made, for example, to *Microwave Duplexers (Massachusetts Institute of Technology, Radiation Laboratory Series)*, pages 350-352, described by Harold K. Farr and Carroll W. Zabel and published by McGraw-Hill Book Co.

The hybrid circuit 200' has a first (201'), a second (202'), a third (203') and a fourth (204') terminals, and is inherently so characterized that the signal entering the magic-T 200' at the terminal 201' appears at the terminals 203' and 204' as waves in phase with each other while the signal entering at the terminal 202' appears at the terminals 203' and 204' as opposite-phase waves.

It will be readily understood that a combination of such a magic-T and a $\pi/2$ phase shifter operates in the same manner as the 90° hybrid circuit 200 in the embodiment of FIG. 1.

As will be appreciated from the foregoing, according to the present invention, a transmitter-receiver circuit can be realized in simple construction and enables communication with no interference between transmitting and receiving signals and with the use of common transmit-receive antennas. Also, the present transmitter-receiver circuit is usable with particular advantages in simple communication systems for mobile service.

What is claimed is:

1. A transmitter-receiver circuit comprising:
   first and second hybrid circuits each having four terminals;
   first and second nonlinear circuits each having high-frequency and low-frequency signal terminals with a non-linear element connected thereto;
   a driver circuit operable to produce a bias voltage in response to a modulating signal; and
   a radio-frequency generator,
   wherein a first one of the four terminals of the first hybrid circuit serves as a common input-output terminal for signal transmission and reception, the second and third terminals of the first hybrid circuit being respectively connected to the high-frequency signal terminals of the first and second nonlinear circuits, the radio-frequency generator being connected to the fourth terminal of the first hybrid circuit, a first one of the four terminals of the second hybrid circuit being connected to the output terminal of the driver circuit, the second and third terminals of the second hybrid circuit being respectively connected to the low-frequency signal terminals of the first and second nonlinear circuits and the fourth terminal of the second hybrid circuit serving as an output terminal for the received signal.

2. A transmitter-receiver circuit as recited in claim 1 wherein said first hybrid circuit is a 90° branch-line hybrid circuit.

3. A transmitter-receiver circuit as recited in claim 1 wherein said first hybrid circuit comprises a magic-T and $\pi/2$ phase shifter connected between the second terminal of said first hybrid and said first nonlinear circuit.

4. A transmitter-receiver circuit as recited in claim 1 wherein said second hybrid circuit comprises a hybrid transformer having a primary winding connected to the second and third terminals of said second hybrid circuit, a second winding connected to the fourth terminal of said second hybrid circuit, and a center tap on said primary winding connected to the first terminal of said second hybrid circuit.

5. A transmitter-receiver circuit as recited in claim 1 wherein each of said first and second nonlinear circuits comprises:
   a bandpass filter connected to said high-frequency terminal,
   a lowpass filter connected to said low-frequency terminal, and
   a diode connected in shunt to both of said bandpass and lowpass filters, the output of said driver circuit serving to establish the bias of said diode through said second hybrid circuit.

6. A transmitter-receiver circuit as recited in claim 5 wherein said driver circuit comprises:
   at least first and second bias voltage sources, and means for selectively connecting said first and second bias voltage sources to the first terminal of said second hybrid circuit.

7. A transmitter-receiver circuit as recited in claim 6 wherein said means for selectively connecting comprises:
  an AND gate having first and second inputs and an output,
  means for supplying a transmission-reception switchover signal to the first input of said AND gate,
  means for supplying a signal representative of transmission data to the second input of said AND gate, and
  a switchover unit controlled by the output of said AND gate to connect said first or second bias voltage source to the first terminal of said second hybrid circuit in response to said signal representative of transmission data when said transmission-reception switchover signal is present.

8. A transmitter-receiver circuit as recited in claim 7 wherein said driver circuit further comprises:
  a subcarrier generator, and
  a two-phase phase-modulator connected to receive a subcarrier signal from said subcarrier generator and interposed between the second input of said AND gate and said means for supplying a signal representative of transmission data.

9. A transmitter-receiver circuit as recited in claim 7 further comprising an envelope detector connected to the fourth terminal of said second hybrid circuit.

10. A transmitter-receiver circuit as recited in claim 8 further comprising an evelope detector and a phase detector connected in series to the fourth terminal of said second hybrid circuit.

* * * * *